United States Patent
Wang et al.

(10) Patent No.: US 10,018,363 B1
(45) Date of Patent: Jul. 10, 2018

(54) HEARTH OVEN

(71) Applicant: Jade Range LLC, Brea, CA (US)

(72) Inventors: Peng Wang, Brea, CA (US); Jiri Rabas, Lynnwood, WA (US); Jian Lai, Placentia, CA (US); Cael T. Goodin, Huntington Beach, CA (US); Danny Huynh, El Monte, CA (US); Ernesto Del Rio, Corona, CA (US)

(73) Assignee: Jade Range LLC, Brea, CA (US)

( * ) Notice: Subject to any disclaimer, the term of this patent is extended or adjusted under 35 U.S.C. 154(b) by 0 days.

(21) Appl. No.: 15/434,804

(22) Filed: Feb. 16, 2017

Related U.S. Application Data

(60) Provisional application No. 62/438,532, filed on Dec. 23, 2016.

(51) Int. Cl.
*F24C 3/02* (2006.01)
*F24C 3/12* (2006.01)
*F24C 3/08* (2006.01)

(52) U.S. Cl.
CPC ............. *F24C 3/128* (2013.01); *F24C 3/025* (2013.01); *F24C 3/087* (2013.01)

(58) Field of Classification Search
CPC .. F24C 3/02; F24C 3/087; F24C 7/087; F27D 1/0006; A21B 1/02; A21B 1/40
See application file for complete search history.

(56) References Cited

U.S. PATENT DOCUMENTS

| | | |
|---|---|---|
| 125,439 A | 4/1872 | Chatain |
| 2,870,624 A | 1/1959 | Sampson |
| 3,267,726 A * | 8/1966 | Sellers, Jr. ............. G01K 17/00 374/30 |
| 3,756,140 A | 9/1973 | Kolivas |
| 4,108,138 A | 8/1978 | Petin et al. |
| 4,474,165 A | 10/1984 | Richardson |
| 4,714,072 A | 12/1987 | Fidler et al. |
| 4,920,899 A | 5/1990 | Blundy et al. |

(Continued)

FOREIGN PATENT DOCUMENTS

| | | |
|---|---|---|
| EP | 0 409 758 A1 | 1/1991 |
| EP | 0 695 923 A1 | 7/1996 |

(Continued)

OTHER PUBLICATIONS

JP 2000253801 A—English machine translation.*

(Continued)

*Primary Examiner* — Jorge Pereiro
(74) *Attorney, Agent, or Firm* — Brinks Gilson & Lione

(57) ABSTRACT

An oven is provided. The oven includes a housing comprising a baking surface and an enclosure. The baking surface extends within the housing and includes side apertures with a first plurality of in-shot burners that extend through each aperture, wherein during operation heated combustion gas from the burners is directed toward the roof of the enclosure during operation. The oven additionally includes a box disposed below the baking surface with an interior that is in thermal communication with the baking surface, wherein the box supports a burner that is oriented such that heated combustion gas from the burners flows through the box and a portion of the heat from combustion is transferred through the baking surface.

24 Claims, 18 Drawing Sheets

(56) References Cited

U.S. PATENT DOCUMENTS

| | | | |
|---|---|---|---|
| 5,413,033 A | 5/1995 | Riccio | |
| 5,497,760 A * | 3/1996 | Alden | F24C 15/322 |
| | | | 126/21 A |
| 6,041,769 A | 3/2000 | Llodra, Jr. et al. | |
| 6,681,758 B1 * | 1/2004 | Collard | A47J 37/0623 |
| | | | 126/19 R |
| 6,951,214 B2 | 10/2005 | Beech | |
| 9,420,800 B1 * | 8/2016 | Froelicher | A21B 1/40 |
| 2007/0108180 A1 * | 5/2007 | Francis | F24C 15/34 |
| | | | 219/400 |

FOREIGN PATENT DOCUMENTS

| | | | |
|---|---|---|---|
| JP | 2000253801 A * | 9/2000 | |
| JP | 2004-114708 | 4/2004 | |

OTHER PUBLICATIONS

WoodStone Fire Deck 9660 Stone Hearth Oven Configuration Brochure, info@woodstone-corp.com, 2 pp., Revised Spring 2017, believed to be publically available before Dec. 23, 2016.

Installation and Operation Manual, Fire Deck Series Stone Hearth Oven, Fire Deck 9660, Fire Deck 11260, www.woodstone-corp.com, 36 pp., Revised Dec. 2016, believed to be publically available before Dec. 23, 2016.

Beech Ovens Stone Hearth Ovens Brochure, www.beechovens.com, 4 pp., Aug. 2011, believed to be publically available before Dec. 23, 2016.

Beech Ovens Installation and Operation Manual, RND-REC-RGO Oven Series, 134 pp., Revision 1—Jul. 2011, believed to be publically available before Dec. 23, 2016.

* cited by examiner

HEARTH OVEN

CROSS REFERENCE TO RELATED APPLICATIONS

This application claims priority from U.S. Provisional Application No. 62/438,532, filed on Dec. 23, 2016, the entirety of which is hereby fully incorporated by reference herein.

TECHNICAL FIELD

This disclosure relates to a hearth oven such as an open oven used in restaurant kitchens to bake pizzas and other items.

Open hearth ovens are generally known in the art and are frequently used by restaurants to bake pizzas and other baked goods in a manner where a chef can bake multiple pizzas (for example) at the same time and the chef can continuously access the baking volume of the oven, with an elongated spatula, without needing to open and close a door. Open hearth ovens are also preferred because they allow the restaurant customer to view the baking of the foods therein and hearth ovens often are an aesthetic feature of a restaurant's kitchen, which is often viewable from the dining areas of the restaurant.

One conventional open hearth oven includes an enclosure that is formed from an insulated housing and includes an open front. The conventional oven is heated by tube burners that are positioned at the sides of the housing and/or at the back of the housing. The tube burners are operated to provide the majority of the heat input within the oven. It is known that during operation significant temperature gradients often exist within the enclosure and upon the baking surface, which necessitates the chef to frequently move the pizzas to be baked between certain positions within the oven to ensure proper baking. The conventional oven is formed with a baking deck that is normally formed from a plurality of baking bricks or other discrete pieces that are positioned together. Other ovens have baking decks that are believed to be formed from a compound of alumina and silica. The necessary movement of pizzas within the oven as they are baked often results in uneven baking and requires the chef to pay a significant amount of attention to move the pizzas as necessary during the baking process.

BRIEF SUMMARY

A first representative embodiment of the disclosure is provided. The embodiment includes an oven. The oven includes a housing comprising a baking surface, right and left side walls, a rear wall and a roof collectively defining an enclosure, the housing further comprising an opening through a front wall of the housing to allow access to the enclosure. The baking surface extends within the housing and extends between the right and left side walls and extends between the front wall and the rear wall, the baking surface includes a thickness, the baking surface comprises an elongate right aperture proximate to the right wall and an elongate left aperture proximate to the left side wall, wherein the baking surface is formed as a continuous monolithic member and does not have any seams or joints therein, the baking surface is silicon carbide cement.

Another representative embodiment of the disclosure is provided. The embodiment includes an oven. The oven includes a housing comprising a baking surface, right and left side walls, a rear wall and a roof collectively defining an enclosure, the housing further comprising an opening through a front wall of the housing to allow access to the enclosure. The baking surface extends within the housing and extends between the right and left side walls and extends between the front wall and the rear wall, the baking surface includes a thickness, the baking surface comprises an elongate right aperture proximate to the right wall and an elongate left aperture proximate to the left side wall, wherein a first plurality of in-shot burners extend through the elongate right aperture and a second plurality of in-shot burners extend through the elongate left aperture, wherein during operation heated combustion gas from the burners is directed toward the roof of the enclosure during operation. A box is disposed below the baking surface with an interior that is in thermal communication with the baking surface, wherein the box supports a burner that is oriented such that heated combustion gas from the burners flows through the box and a portion of the heat from combustion is transferred through the baking surface.

Advantages of the disclosed device will become more apparent to those skilled in the art from the following description of embodiments that have been shown and described by way of illustration. As will be realized, other and different embodiments are contemplated, and the disclosed details are capable of modification in various respects. Accordingly, the drawings and description are to be regarded as illustrative in nature and not as restrictive.

DETAILED DESCRIPTION OF THE DRAWINGS AND THE PRESENTLY PREFERRED EMBODIMENTS

Figure 1:
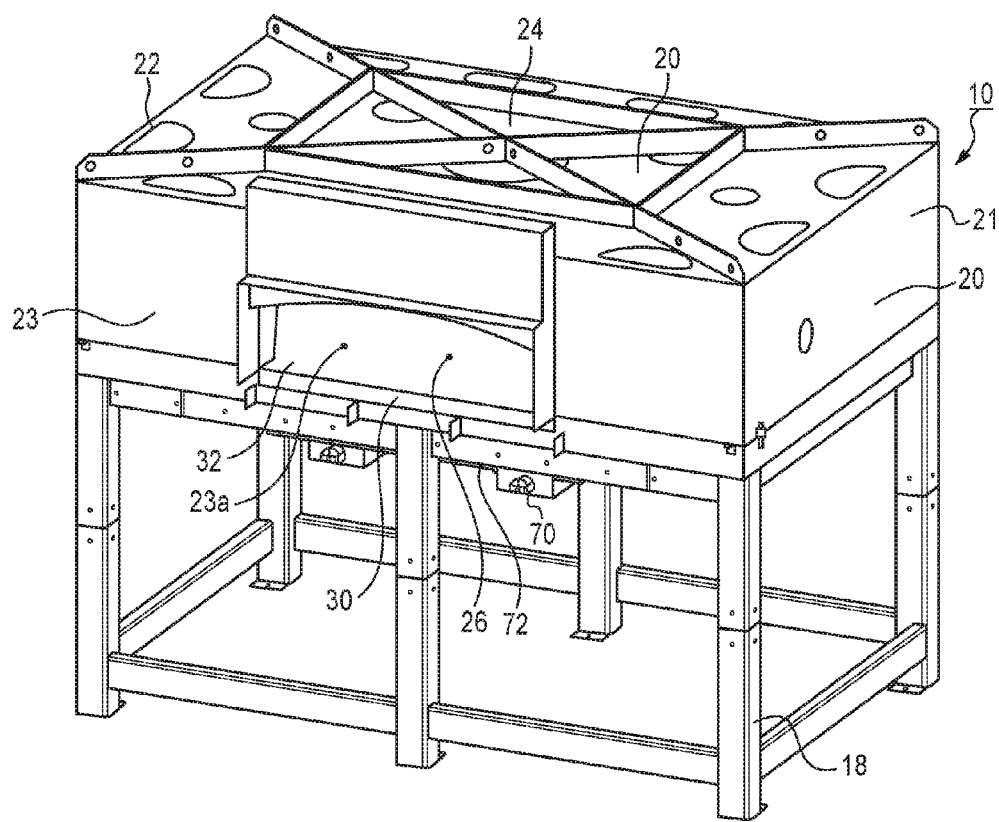
FIG. 1 is a perspective view of an oven, such as a hearth oven.

Turning now to FIGS. 1-14, an oven 10 is provided. The oven may be open hearth oven or another type of deck oven. The oven 10 may be designed with an open front that is continuously accessible during cooking operations by the chef for convenience as well as to provide customers with a view of the food being cooked within the enclosure 26 within the oven 10.

In some embodiments, the oven 10 may be provided with a rectangular cross-section (as depicted herein in the figures), while in other embodiments, the oven 10 may be round, oval, triangular, trapezoidal, or other shapes (either geometric or arbitrary) depending upon the design constraints of the restaurant kitchen and the desires of the customer. While the oven 10 depicted and specifically described herein is a rectangular oven, one of ordinary skill in the art will easily contemplate that the disclosed design can be successfully modified to other shapes with a thorough review of the subject specification and figures and without undue experimentation.

In some embodiments, the oven 10 may be formed from a housing 20 that is supported on a stand or frame 18, or in other embodiments upon a structure provided by the restaurant facility. The frame may include reinforcing members that are configured to rigidly support the structure of the housing and to provide an open space for mechanical connections to the gas service (90, FIG. 6) that is used for the combustion within the burners of the oven (discussed below).

The housing 20 may include a front wall 23, a left wall 21, a right wall 22, a rear wall 25, and a top, or ceiling, or roof 24, each of which, in combination with the baking deck 30, enclose a baking enclosure 26 within which food is baked in the hot environment within the baking enclosure 26 and due to contact with the top surface 32 of the baking deck 30. In some embodiments, the front wall 23 may include an opening 23a that allows access into the baking enclosure 26. The opening 23a may be always open or may be selectively closable with a door (not shown) or with a block that can be put in place to selectively block the opening 23a and can be removed to allow access through the opening 23.

In the embodiment depicted in the figures, the front wall 23, the left wall 21, the right wall 22, the rear wall 25, and the roof 24 may include multiple layers or multiple walls that are disposed between the portion of the respective wall that forms the barrier to the cooking enclosure and the structure that is disposed at the outer surface of the housing 20. For the sake of brevity, the walls discussed herein refer to the structure that directly encloses the baking enclosure 26 as well as, when present, other walls that are disposed outboard of the structure that directly encloses the baking enclosure 26. In some embodiments, insulation is disposed between all or some of the multiple walls to prevent heat from the enclosure from transferring out of the enclosure through the walls, for efficiency purposes as well as to minimize the contribution of the heat from the oven 10 in increasing the temperature of the kitchen or other location where the oven 10 is disposed.

In some embodiments, the inner layers of the various walls (in embodiments where one or more of the walls are multiple layers) may be entirely planar, may have a portion that are planar (such as the portion that is in contact with and extends from the upper surface 32 of the baking deck 30 (discussed below)), or may be arcuate. Any discussion of the structure of the oven with reference to the orientation to any of the walls is with reference to a vertical planar wall that encloses a portion of the housing 20, but one of ordinary skill in the art will understand that the oven disclosed herein can be constructed with walls of various shapes and orientations within the scope of this disclosure for space constraints or for ornamental reasons.

The housing further includes a baking deck 30 that is configured to support the food product to be baked within the oven. The baking deck may extend between the left and right walls 21, 22 and between the front wall 23 and rear wall 25. The baking deck 30 may be supported by one, some or all of the walls and ultimately may be supported by the frame 18 or other structure that supports the oven 10.

In some embodiments, the baking deck 30 may be cast in place with a form through a conventional casting process, with the form establishing a bottom surface front edge, left edge, right edge and a rear edge of the baking deck 30. The material forming the baking deck 30 may be mixed and poured into the form to establish the baking deck with the desired geometry and the desired thickness. Once the material forming the baking deck 30 is poured the top surface 32 is established and smoothed using processes well known in the art.

In some embodiments, the baking deck 30 may include one or more apertures therewith that are provided during the casting process. Specifically, the baking deck 30 may be formed with elongate voids 35, 36 that are formed on the left and right sides of the baking deck 30, respectively. The voids 35, 36 may be formed by establishing forms to prevent material being poured from resting in those locations. In some embodiments, the baking deck 30 may additionally or alternatively include a rear void 37 that extends proximate to the rear wall 25. The voids 35, 36, 37 may be provided to allow for burners to extend through the baking deck 30 such that the heated combustion products from the burners are directed into the enclosure 26 to assist with baking the food product disposed upon the top surface 32 of the baking deck 30.

In some embodiments, each of the voids 35, 36, 37 (in embodiments where these or other voids are provided) may include a respective shroud 45, 46, 47 that extends above the top surface 32 of the baking deck 30. The one or more shrouds, when provided, may provide a barrier between the top surface 32 of the baking deck 30 and the respective void to prevent food crumbs, liquids, dirt, debris and the like that might be present within the environment from falling into the void and potentially fouling the burners (discussed below) disposed through the respective voids. The left and right shrouds 45, 46, 47 may also provide structural support for the burners that extend through the respective voids to properly align and support the burners.

Figure 7:
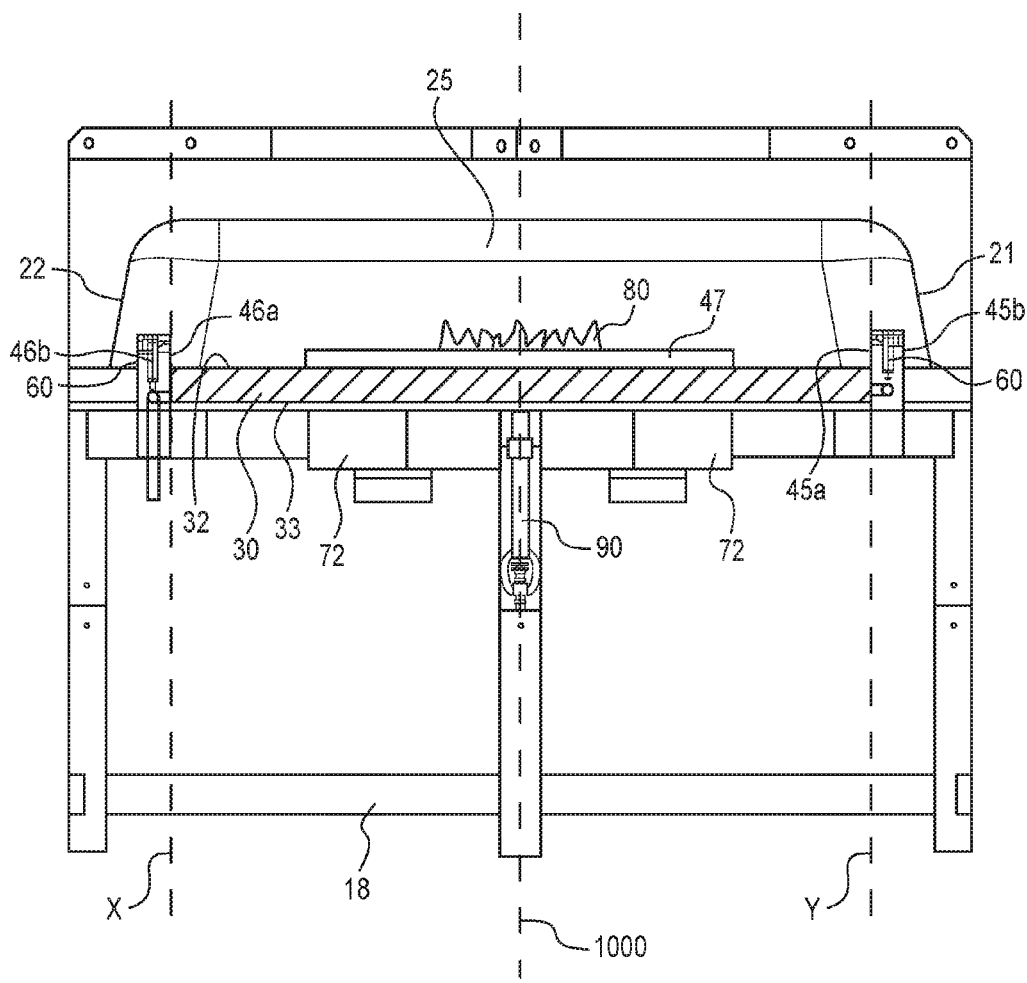
FIG. 7 is a front sectional view of the oven of FIG. 1.

As depicted in FIGS. 2, 5, 6, 7, in some embodiments, one or both of the left and right shrouds 45, 46 may be configured such that their side walls 45a, 46a are parallel to the respective facing side wall (21, 22, 23, 24) of the housing 20, i.e. the side walls of the shroud extend vertically within the enclosure 26, i.e. with a line (Y, X) through the side wall 45a, 46a aligned in parallel to a vertical line 1000 through the center of cooking deck 30, i.e. the left to right centerline (FIG. 7). In some embodiments, the respective side wall 45a (46a) that is closest to the center of the cooking deck 30 is in this orientation, in other embodiments, the respective side wall 45b (46b) that is further away from the center of the cooking deck 30 is in this orientation, and in some embodiments both side walls 45a, 46b (44a, 44b) of the respective shroud 45, 46 are in this orientation.

Figure 8:
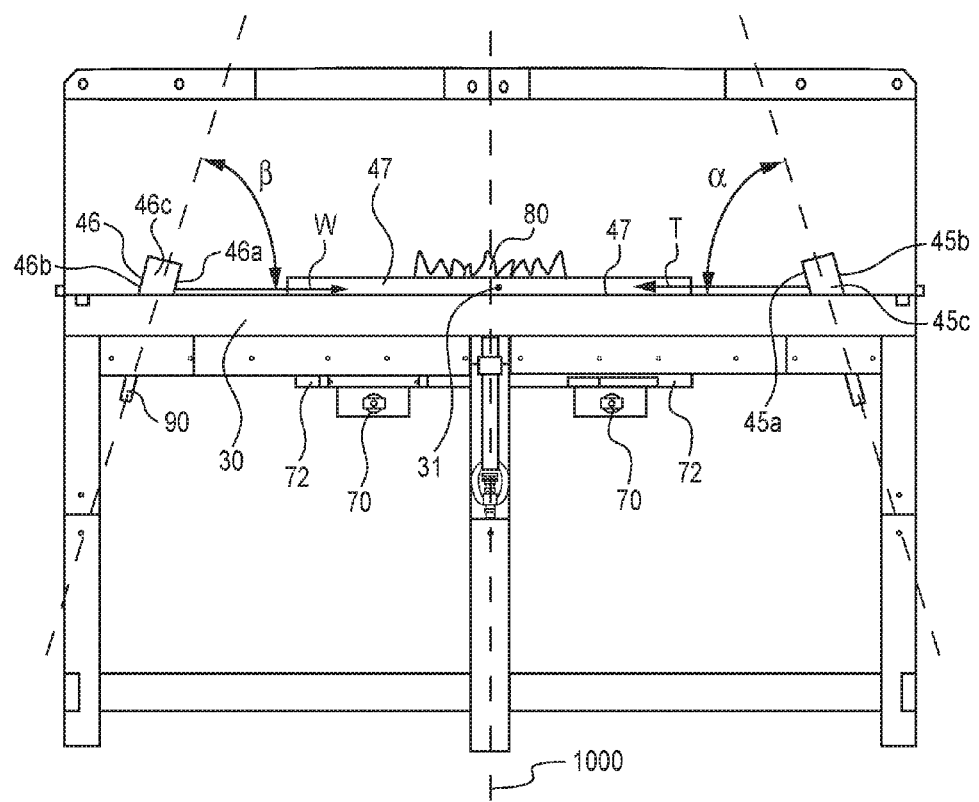
FIG. 8 is a front view of the oven of FIG. 1 with modified shrouds, with the front wall removed.
Figure 9:
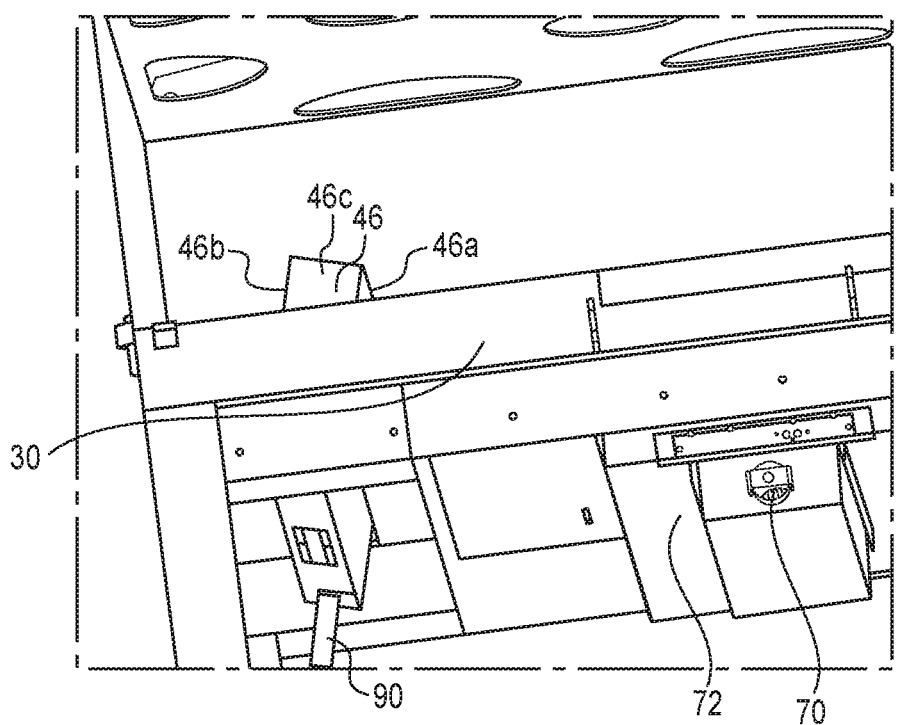
FIG. 9 is a partial bottom perspective view of the oven of FIG. 8.
Figure 10:
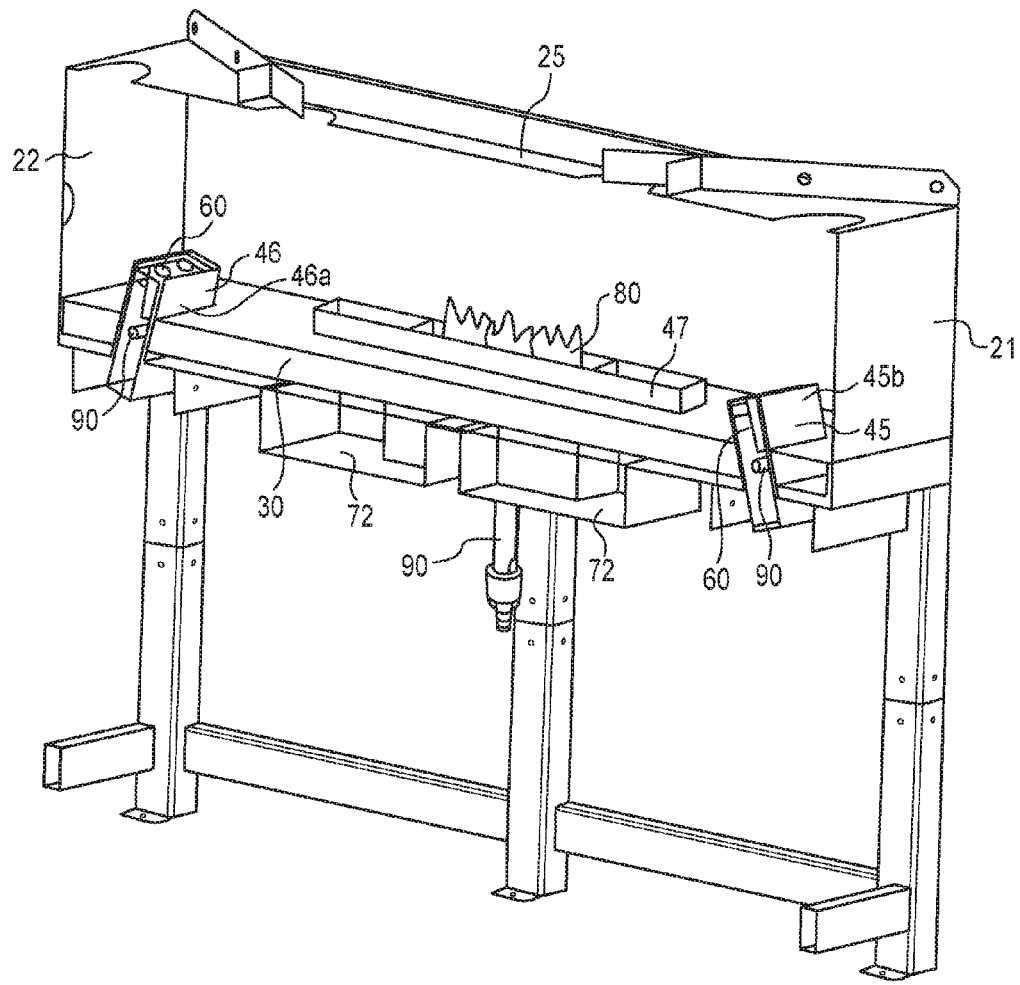
FIG. 10 is a perspective cross-sectional view of the oven of FIG. 8.
Figure 10A:
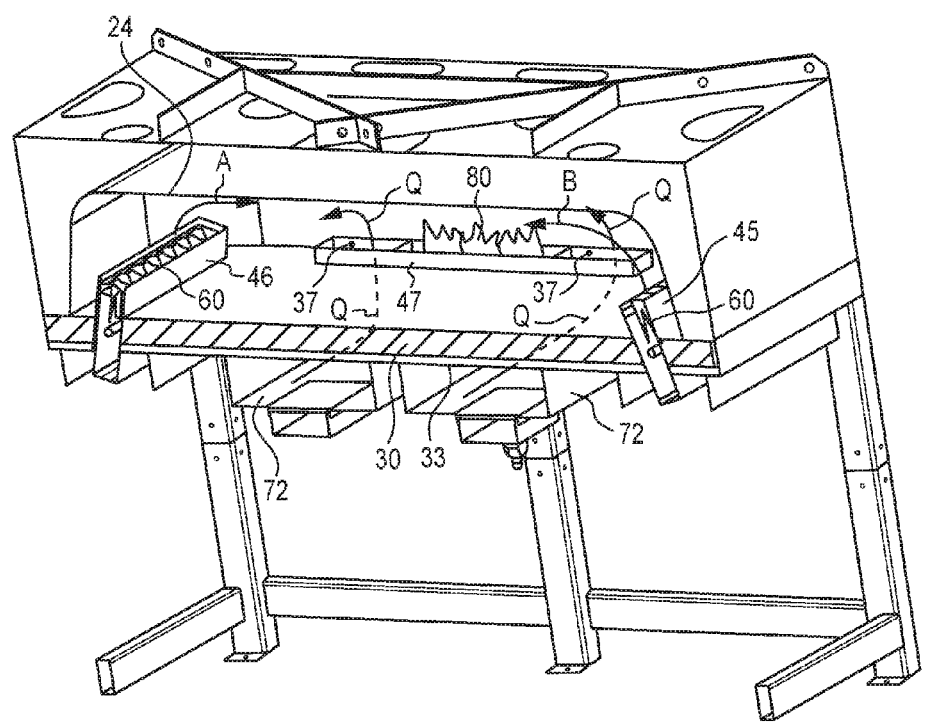
FIG. 10a is another perspective cross-sectional view of the oven of FIG. 8, schematically depicting the general flow path of combustion air from the left and right burners and from the burner positioned below the baking deck, within the baking compartment.
Figure 11:
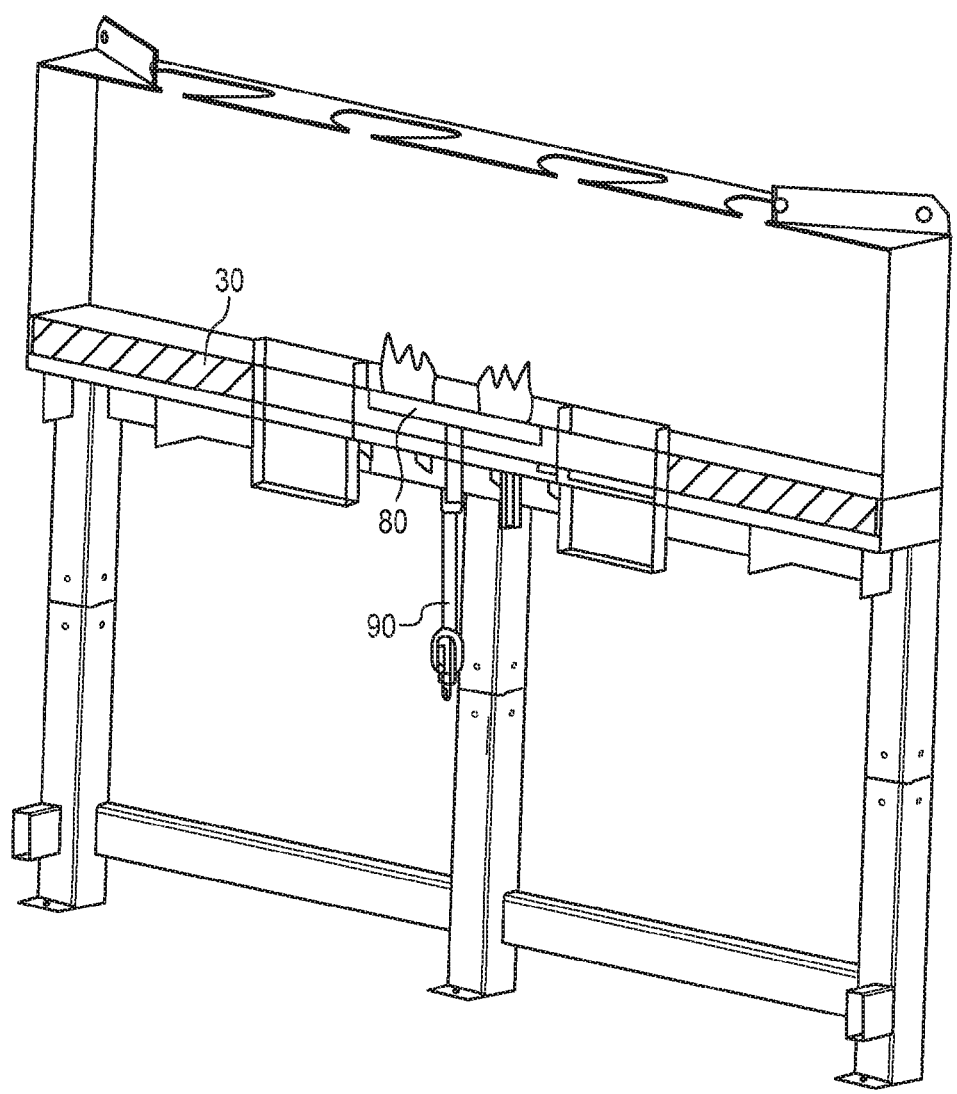
FIG. 11 is another perspective cross-sectional view of the oven of FIG. 8.

In other embodiments, depicted in FIGS. 8-10, the side walls 45a (45b), 46a (46b) or one or both of the left and right shrouds 45, 46 may be disposed at an acute angle (β for the side walls 45a, 45b; α for side walls 45a, 45b) with respect to the top surface 32 of the cooking deck 30. In some embodiments, the acute angle may be about 75 degrees, or about 80 degrees, or within the range of between about 50 degrees to 90 degrees, inclusive of all angles within this range, such as from 50 to 80 degrees. In some embodiments, one or both of the side walls 45a, 45b; 46a, 46b are disposed such that a horizontal vector component (T, W) of a line through the side wall extends horizontally toward a center 31 of the baking surface 30, while in other embodiments one or both of the side walls may be disposed such that a horizontal vector component of a line through the side wall extends away from the center 31 (not specifically shown, but one of ordinary skill in the art would understand that the shrouds would extend in the opposite direction as depicted in FIG. 8, with the horizontal vector components extending in the opposite direction as T and W in FIG. 8. In some embodiments, one or both of the end walls 45c, 46c of the respective left and right shrouds 45, 46 may extend at an acute angle, such that a horizontal vector component of a line through the end wall extends toward the rear wall 25 of the housing 20.

In some embodiments, the burners 60 (discussed below) are supported by the shroud 45, 46 and the burners are aligned in the same orientation as one or both of the side walls 45a, 45b; 46a, 46b of the respective shroud, and/or in some embodiments the orientation of the end walls 45c, 46c such that the heated exhaust from the burners (which heats the baking enclosure 26) is directed toward the center of the environment, (or in another direction within the enclosure, such as the rear wall 25) which may assist with evenly maintaining the temperature within the baking enclosure 26. The burners may be disposed at the same angle as the angle of the respective wall of the shroud, or the burners may be disposed at a different angle from the respective wall of the shroud. In some embodiments, some burners may be aligned at an acute angle with respect to a plane through the top surface 32 of the baking deck 30, while in other embodiments, some burners may be disposed in this orientation, while other burners may be disposed vertically so that their heated exhaust gas leaves the burner vertically. One of ordinary skill in the art will understand after a thorough review of the subject specification and figures, that one of ordinary skill in the art would be able to design an enclosure and burners with the appropriate spacing and orientation to create a balanced heat environment within the enclosure with only routine optimization by the designer.

In some embodiments, the burners 60 that are disposed through one or both of the left and right voids 35, 36 (and supported by the respective left and right shrouds 45, 46 as well as in some embodiments additional support structure disposed below the lower surface of the baking deck 30) may be in-shot burners. In some embodiments, one or both of the left and right voids 35, 36 may receive a plurality of in-shot burners, such as 5, 7, 10, 11 in-shot burners (or in other embodiments, any number of in shot burners between 2-10) disposed proximate to each other, in some embodiments disposed along a single line or in another geometric arrangement such as in two lines, or in a rectangular formation (or other formations as optimized by one of ordinary skill in the art). The burners 60 may be disposed with consistent spacing between all neighboring burners or with different spacing between some burners.

Figure 5:
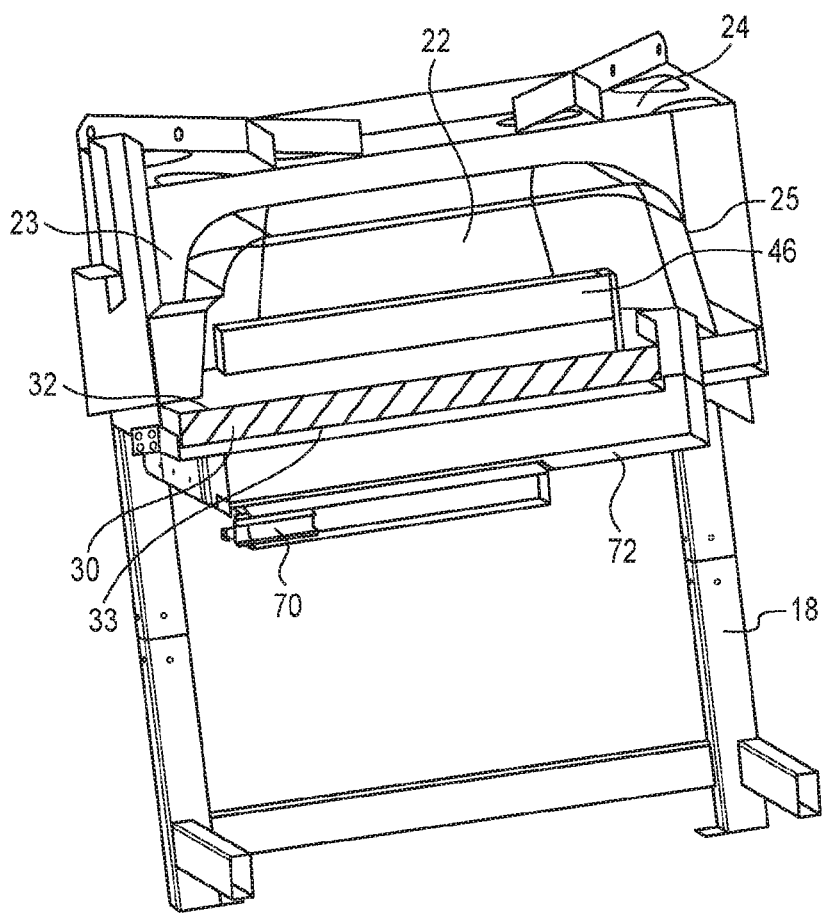
FIG. 5 is a sectional perspective view of the oven of FIG. 1.
Figure 5A:
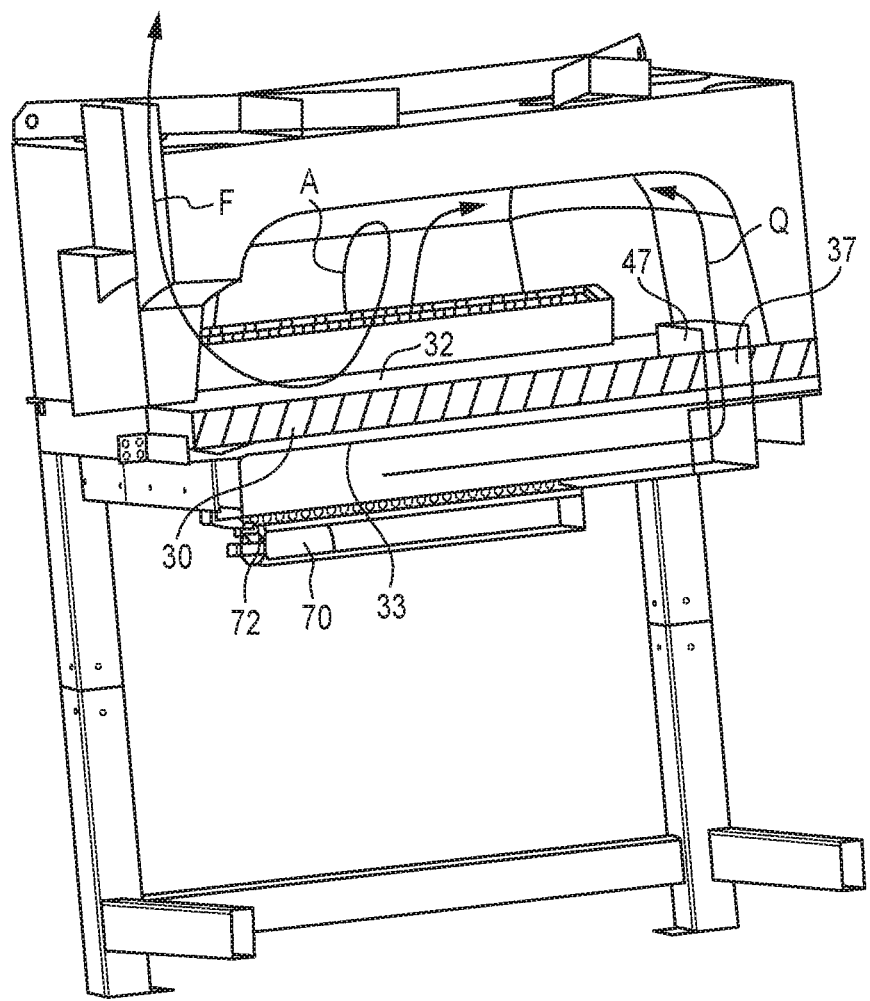
FIG. 5a is a sectional perspective view of the oven of FIG. 1 with modified shrouds and burners, schematically depicting the general flow path of combustion air from the left burners and the burner below the baking deck within the baking compartment.
Figure 6:
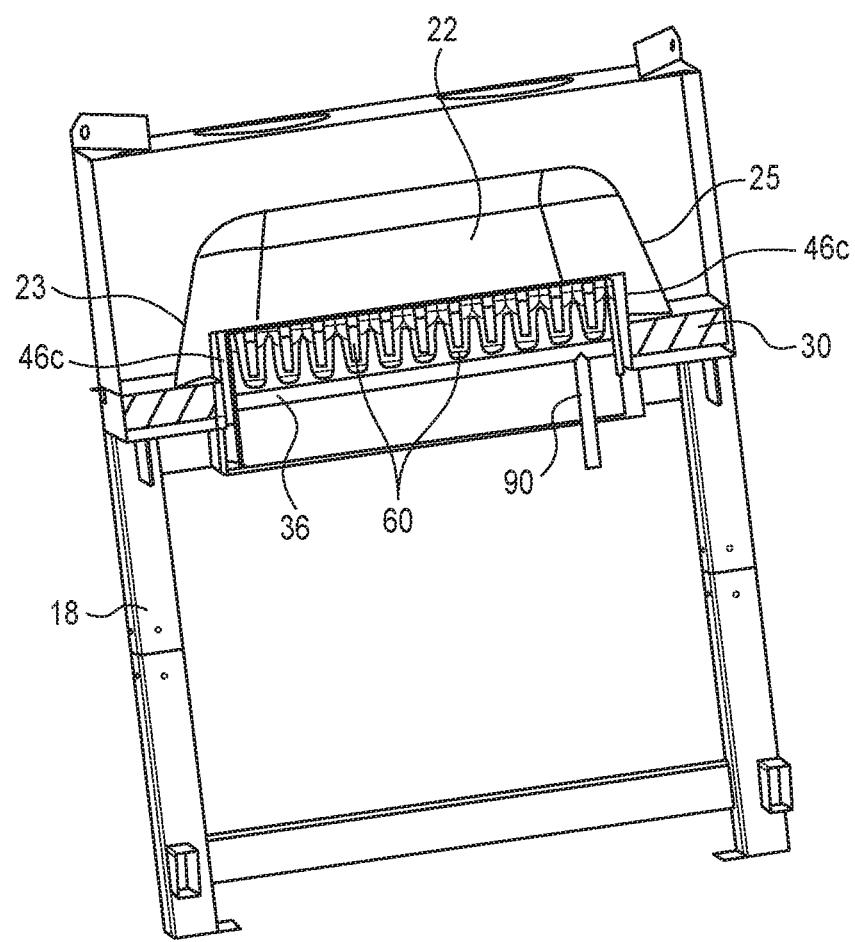
FIG. 6 is another sectional perspective view of the oven of FIG. 1 cut through the right shroud.
Figure 8A:
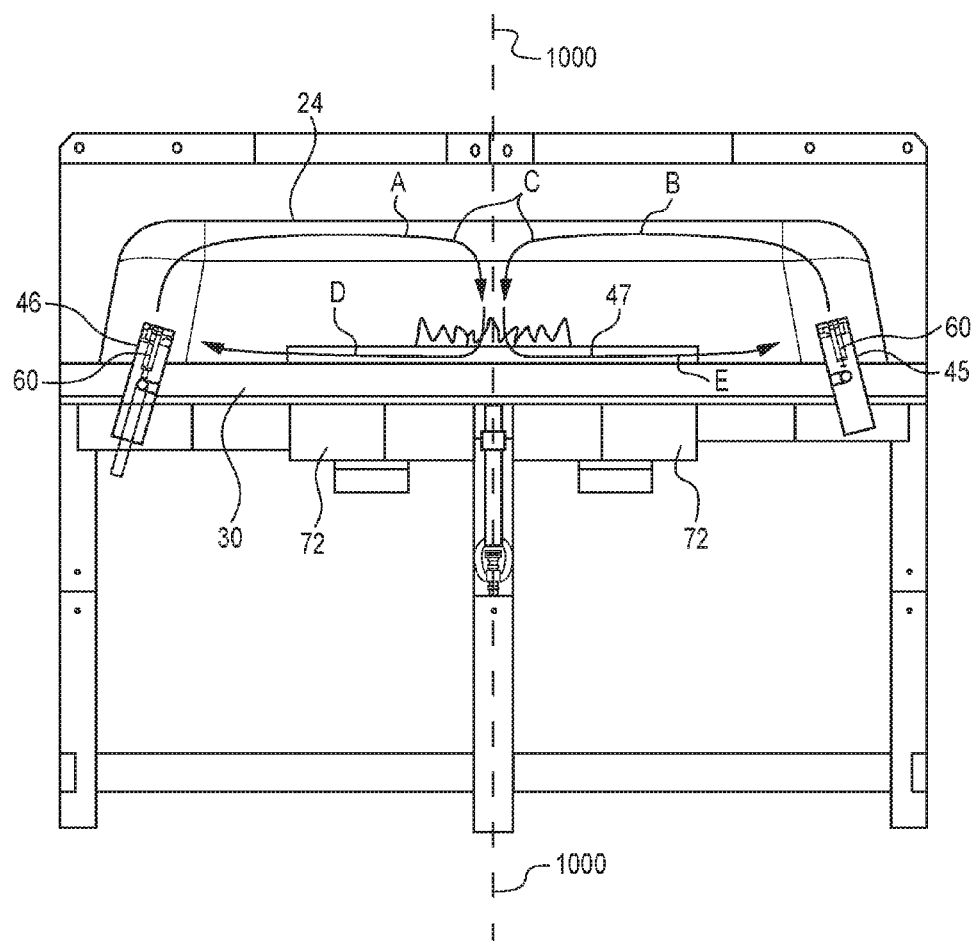
FIG. 8a is a cross-sectional front view of the oven of FIG. 1 with modified shrouds and burners, schematically depicting the general flow path of combustion air from the left and right burners within the baking environment.
Figure 8B:
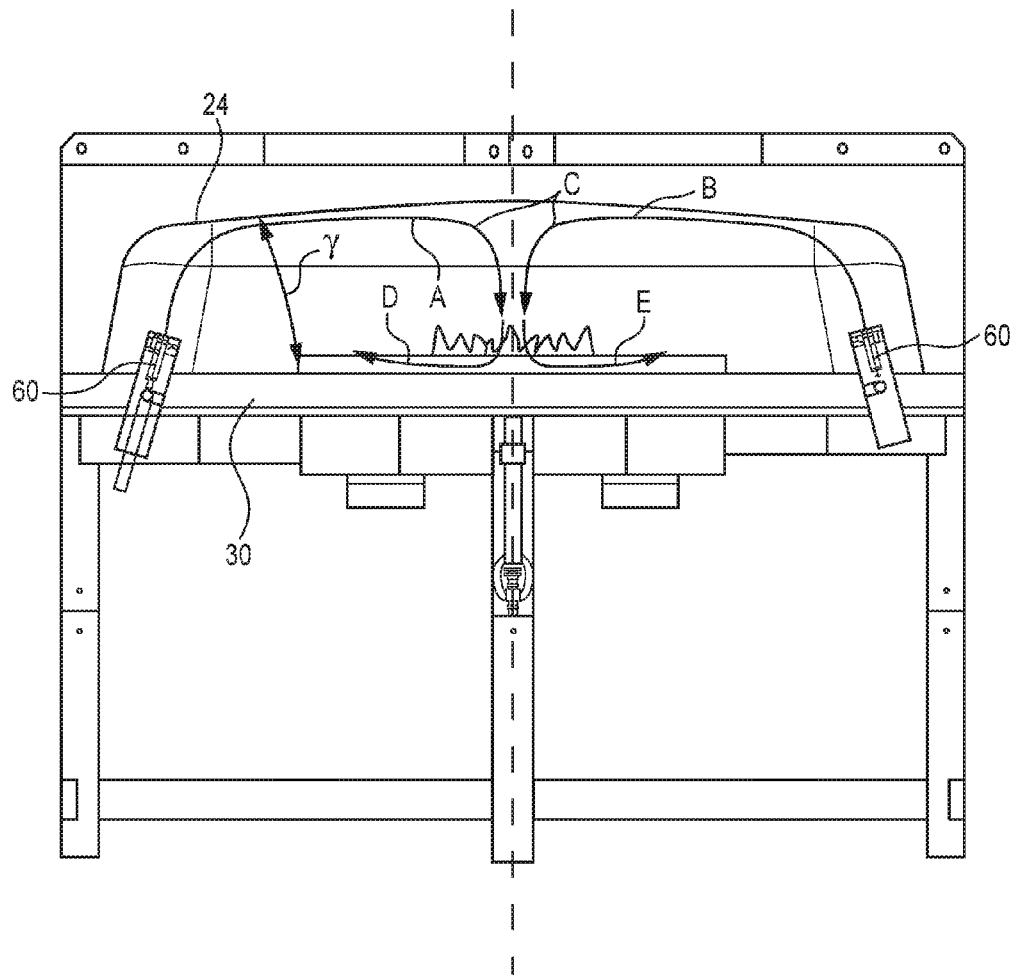
FIG. 8b is a cross-sectional front view of the oven of FIG. 1 with a modified roof and modified shrouds and burners, schematically depicting the general flow path of combustion air from the left and right burners within the baking environment.

As shown with reference to FIGS. 5a, 8a, 8b, the housing 20, and specifically the roof and the baking deck are collectively disposed to promote circulation of heated air within the housing 20 to promote even heating of food products disposed upon the baking deck at various locations. As shown in FIG. 8a, the heated combustion gas from the left burners 60 leaves along path B, which initially leaves from the burner in a path generally parallel with the orientation of the burner upon the baking deck, and then is urged toward the left to right centerline of the housing, in some embodiments due to the angle of the roof 24 of the housing where the combustion air interacts with the roof (as discussed below). Similarly, the heated combustion gas from the right burners 60 leaves along path A, which initially leaves the burner in a path generally parallel with the orientation of the burner upon the baking deck, and then is urged toward the left to right centerline of the housing, in some embodiments due to the angle of the roof of the housing where the combustion air from the right burner 60 interacts with the roof. As shown, proximate to the left to right centerline 1000 of the housing, when both the left and right plurality of burners 60 are operating the paths B and A interact with each other at location C. The paths B and A when interacting with each other are urged downwardly toward the baking deck 30, where a portion of the combustion air flows toward the burners again (D, E) and another portion of the combustion air flows out of the oven through the exhaust F. The looping flow of combustion air as depicted in FIG. 8a promotes even heating over the entire surface of the backing deck. One of ordinary skill in the art will understand (with a thorough review of the subject specification) that the flow paths A, B, D, E depicted in these figures are schematic only and simplified, and while combustion air is urged into these paths, some of the air flow is more complicated that this simplified path.

In some embodiments, the roof 24, and specifically portions of the roof 24 that are above, or more specifically in-line with the exhaust from the respective left and right in-shot burners 60, is disposed at an acute angle $\gamma$ with respect to the top surface of the baking deck 30. Specifically, the roof 24 is formed such that combustion gas reaching the roof from the plurality of in-shot burners 60 is urged toward the left to right centerline 1000 of the baking deck 30 (as schematically shown as flowpaths A, B in FIG. 8b). In some embodiments, the acute angle ($\gamma$) may be the same angle as the angle of the respective burner 60 positioned below the portion of the roof, while in other embodiments the acute angle $\gamma$ may be a different angle than the angle of the burner 60 disposed below the portion of the roof, and in still other embodiments the roof may be an acute angle $\gamma$, while the burners are perpendicular to the top surface of the baking deck 30.

In some embodiments, the portion of the roof generally above the respective left and right plurality of burners (and specifically, generally in-line with a line from the burners) may have a curved orientation, with a changing angle along its length, which may be continuously changing (with the same curvature along its length) or discontinuously changing, such that the magnitude of the acute angle is decreasing as the roof travels toward the left to right centerline of the roof. One of ordinary skill in the art with a thorough review of this specification will appreciate that the shape of the roof from above the respective left and right burners and to the left to right centerline of the housing will be provided to guide combustion air from the left and right plurality of in-shot burners toward the center of the housing, so that the combustion gas flows from both the left and right plurality of burners ultimately interacts with each other, and particularly in some embodiments interacts to create the looped flow paths A and B depicted in FIG. 8b. In embodiments where the left and right plurality of burners 60 are disposed at acute angles α, β with respect to the top surface of the baking deck (FIG. 7), the roof above the burners may be parallel to the baking deck and the initial angle of attack of the combustion air from the burners may urge the combustion air (from both the left and right in-shot burners) toward the left to right centerline of the housing due to the relative angle of the combustion flow with respect to the roof 24. One of ordinary skill will understand that an optimization of the shape of the roof in order to promote the lopped flow paths A and B would only be a product of routine optimization upon a thorough review and understanding of this disclosure.

The baking deck 30 is best show in FIGS. 2, 3, 7, 12, and 13. As discussed above, the baking deck 30 may include a flat horizontal top surface 32, which is the surface upon which to be baked within the oven rests. The baking deck 30 may be formed as a continuous monolithic member that is formed without any seams or joints therein. In some embodiments, the baking deck 30 may be formed by cement that is poured into a form that established the geometry of the baking surface 30 as well as establishes the voids 35, 36, 37 when provided as discussed above. The baking deck 30 may be formed as silicon carbide cement. In one representative embodiment, the baking deck 30 may be formed from a silicon carbide cement with the following formulation (by percent): SiC—53.3%; $Al_2O_3$—32.3%; $SiO_2$—11.9%; $Fe_2O_3$—0.4%; CaO—0.9%; $TiO_2$—0.7%; Alkalies 0.2%. In some embodiments, all of these may be present but at different percentages, such as about 53% or between 50-55% SiC, such as about 32% or between 30-35% $Al_2O_3$, such as about 11% or between 10-15% $SiO_2$ with the other percentage of the other components modified accordingly. The term "about" is specifically defined here to include the value referred to as well as all percentages within plus or minus 2% of the value referred to. In other embodiments, the one or more of the above may be missing and replaced with a similar compound as would be understood by one of skill in the art. In still other embodiments, the formulation may be different from the above with some compounds missing and replaced with other compounds. One of ordinary skill in the art with a thorough review of this specification will understand potential modification of the formula of the cement and be well equipped to modify the formula based upon desired properties of the cement used to form the baking deck 30.

Figure 12:
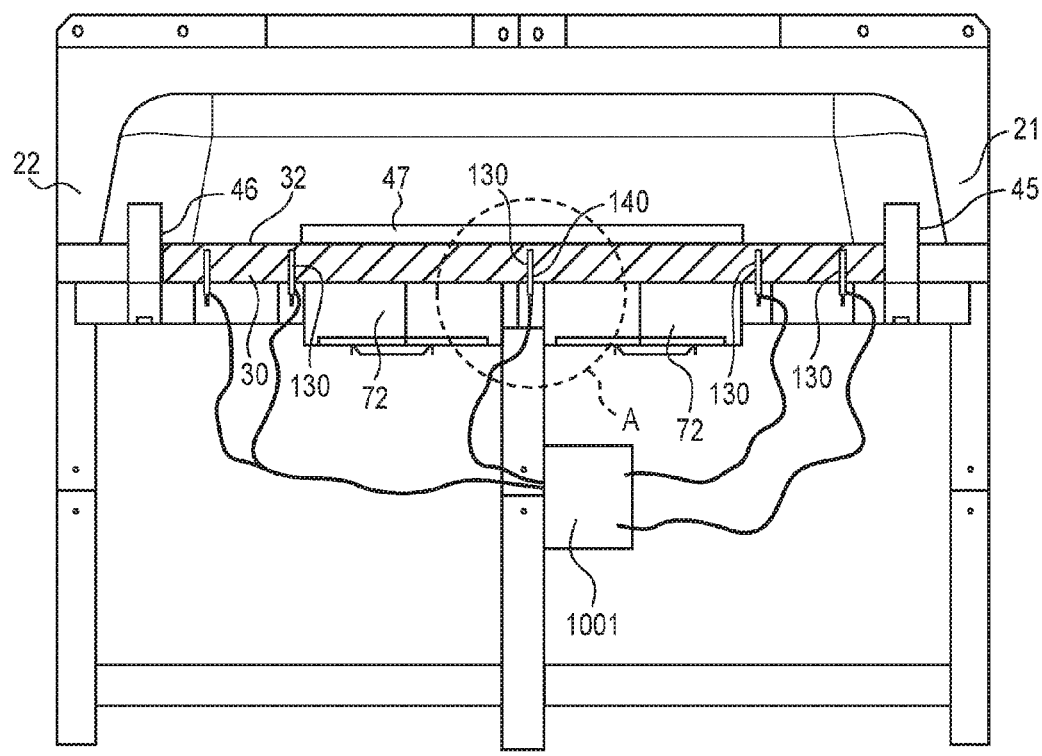
FIG. 12 is a front cross-sectional view of the oven of FIG. 8.
Figure 13:
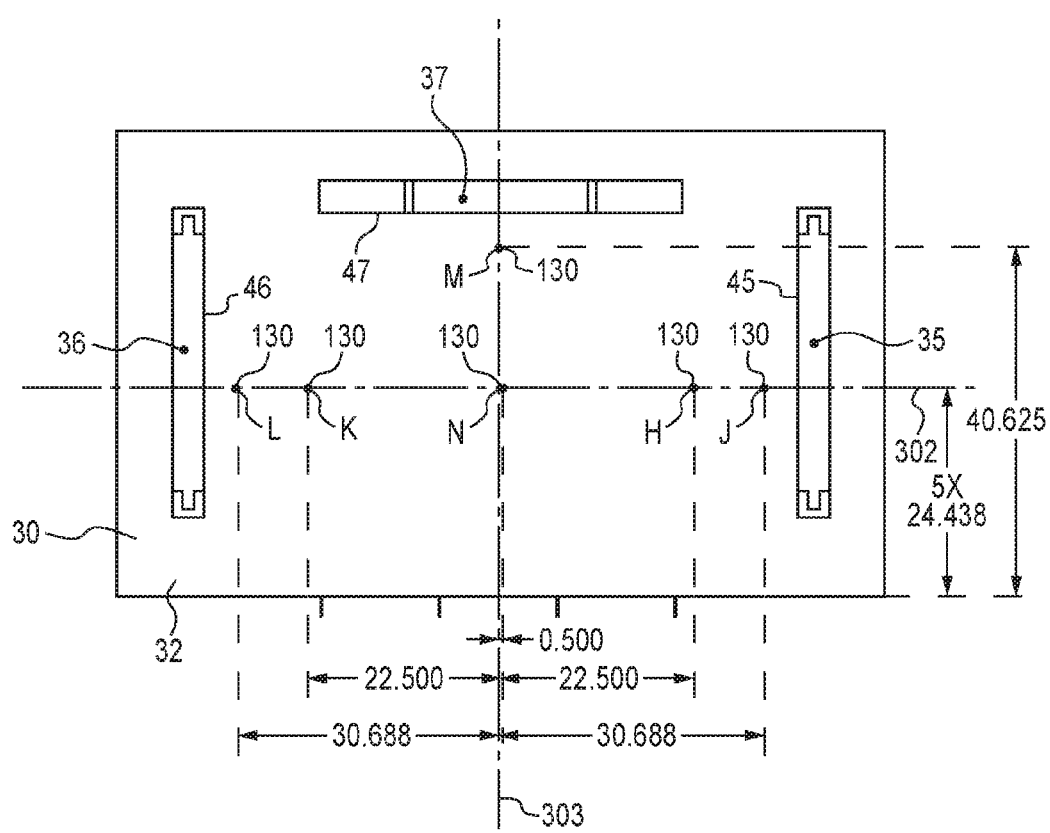
FIG. 13 is a top view of the baking deck of the oven of FIG. 1, which provides dimensions for the placement of a plurality of thermocouples embedded within the baking deck in a preferred embodiment, with the dimensions depicted in inches.
Figure 14:
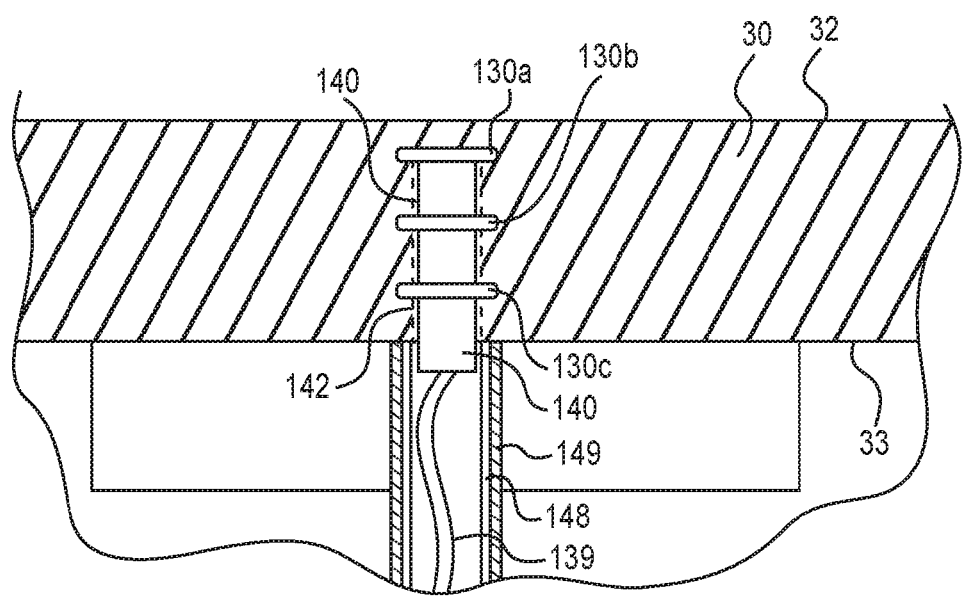
FIG. 14 is a detail view of detail A of FIG. 12.

In some embodiments, the baking deck 30 may be formed with one or a plurality of thermocouples 130 that are disposed within the baking deck 30. As shown in FIGS. 12-14, the thermocouples 130 are disposed within the baking deck 30, such as embedded below the top surface 32 and above the lower surface 33. The one or a plurality of thermocouples 130 are positioned within the form before the cement material is poured into the form so that, once the material is poured and cured there are no air or other gaps between the material forming the baking deck 30 and the thermocouples 130.

In one representative embodiment, multiple thermocouples 130a, 130b, 130c may be positioned vertically on top of each other and embedded within the baking deck 30 and supported by a single assembly 140. In some embodiments, the assembly 140 may be initially surrounded by a protective layer 142 (FIG. 14) that surrounds the structural portions of the assembly 140 with the thermocouple leads extending out of the protective layer and buried within material of the cast baking deck 30. The protective layer 142 may protect the components of the assembly during the casting or curing process. In some embodiments, the protective layer may remain with the assembly, or in other embodiments, the protective layer may melt during the hot curing process. Each thermocouple 130a, 130b, 130c may be attached to wires 139 that run through the baking deck 30 and out of the bottom surface 33 of the baking deck and to the controller 1001. In some embodiments, the thermocouple wires 139 extending from the thermocouples are secured into location with a rigid tube 148, and in some embodiments, foam insulation 149 is wrapped around the tube to act as an expansion joint for the tube.

In embodiments where multiple thermocouples are provided in a single assembly, the multiple thermocouples may extend into the baking deck 30 in a stacked vertical fashion to allow for heat that is flowing vertically through the baking deck 30 to consecutively interact with the stacked thermocouples 130. In one embodiment, a first thermocouple 130a may be disposed within the baking deck and proximate to the top surface 32 of the baking deck, such as within 0.25 to 0.5 inches of the top surface 32. A second thermocouple 130b may be disposed at or proximate to a middle of the baking deck, such as substantially (or exactly) equidistant from the top and bottom surfaces 32, 33 of the baking deck. In some embodiments, a bottom thermocouple 130c may be provided that is disposed proximate to the bottom surface 33 of the baking deck, such as within 0.25 or 0.5 inches. One of ordinary skill in the art with a thorough review of the subject disclosure will easily understand that, for the top thermocouple 130a it is often desired to position the thermocouple 130a as close as possible to the top surface 32 of the baking deck 30 so that the temperature data from that thermocouple will be as close as possible to the actual surface temperature of the baking deck 30 at that position. It will be appreciated that the distance below the top surface may be a function of the properties of material used to make the baking deck 30, such that the required strength and durability of the baking deck 30 is maintained with the amount of material between the top surface 32 and the thermocouple being minimized, and one of ordinary skill would be able to optimize (i.e. minimize) that distance with routine testing and optimization of the design and without undue experimentation.

The thermocouples 130 may extend far enough from the assembly 140 into the baking deck 30 so that the heat transfer effect of the assembly on the measured temperatures by the thermocouple can be neglected by the controller. The controller 1001 may include a microprocessor that is programmed to monitor independently the temperatures (and the change in temperature) of the vertically stacked thermocouples 130 to understand the heat flow rate through the baking deck 30 at that location upon the baking deck and selectively operate the burners (the side in-shot burners 60 and/or the burners 70 below the baking deck 30) to control temperature proximate to that location as warranted.

In some embodiments, at least one thermocouple 130 is positioned along the left to right center line of the baking surface, or if not exactly along the geometric centerline within a short distance (such as one half inch (FIG. 13), or one or two inches) from the geometric left to right centerline, such as when mechanical clearance is not available to position the thermocouple at the geometric center 303 (FIG. 13) of the baking deck 30 (position N in FIG. 13). In some embodiments, thermocouples 130 may be disposed outboard of the center thermocouple 130 on one or both of the right and left sides of the center thermocouple, such as in positions H, J and/or positions K, L of FIG. 13. In some embodiments, some or all of the respective thermocouples may be positioned proximate to a front to rear centerline along the baking deck 30. In other embodiments, some or all of the thermocouples 130 may be positioned proximate to a line 302 positioned between the front wall 23 and the front of the rear void 37. One of ordinary skill in the art after a thorough review of the subject specification and figures will easily comprehend that centered thermocouples (front to back/rear void; left to right) may provide a reliable representation of the temperature within enclosure and the baking surface 30 such that the controller 1001 (FIG. 12, schematic) may be configured to operate burners 60 (discussed below) within the oven in order to maintain the desired temperature therein.

Additional thermocouples (disposed outboard of the central thermocouple or in other positions, such as proximate to the left to right center line 303 and closer to the front wall and/or back wall 23, 25) (e.g. position M of FIG. 13) may be used by the controller 1001 to further control the operation of the burners based upon the more localized temperature information provided to the controller by multiple burners. In some embodiments, thermocouples or other types of temperature sensors may be positioned in other locations within the oven, such as on one or more side walls, the roof, within the exhaust. These thermocouples may additionally or alternatively provide temperature information to the controller 1001, which may be used by the controller to control the operation of the burners 60, 70 either solely, or in some embodiments in conjunction with stored information based upon a recipe or user desired temperature setting.

In some embodiments, the oven 10 may include burners 70 that are disposed below the baking surface 30 such that the heat generated by the burners 70 is transferred to the baking surface through the bottom surface 33 and is transferred through the baking surface 30 by conduction. One of ordinary skill in the art will comprehend with a thorough review of the subject specification and figures that one burner 70 may be provided below the left to right centerline of the baking surface 30, or in other embodiments, two burners 70 may be provided both outboard of the left to right centerline, such as at equal spaces from the left to right centerline.

In some embodiments, the burner 70 within the box is positioned such that its heated combustion products are directed into a box 72 that is below the baking surface 30 such that flow through the box flows along the bottom surface 33. Heat from the combustion air may be transferred to the baking surface by convection, with that heat then flowing through the baking surface and to the top surface 32 by conduction, with combustion air ultimately being exhausted away from the box 72. The size of the box 72 may be shaped and sized to maximize the time that combustion air is present within the box 72, to maximize the heat transfer to the baking deck 30 for efficiency purposes, while still allowing exhaust of combustion air from the box 72 as needed. The controller 1001 may be configured to selectively operate the one or more burners 70 based upon the measured temperature within the thermocouples 130 that are proximate to or above the respective box 72, as well as based upon a measured rate of change of the measured temperature. In embodiments where the burners 70 are maintained with a box 72, separate boxes 72 that support separate burners 70 may be positioned on opposite sides of the left to right centerline through the baking surface.

Figure 2:
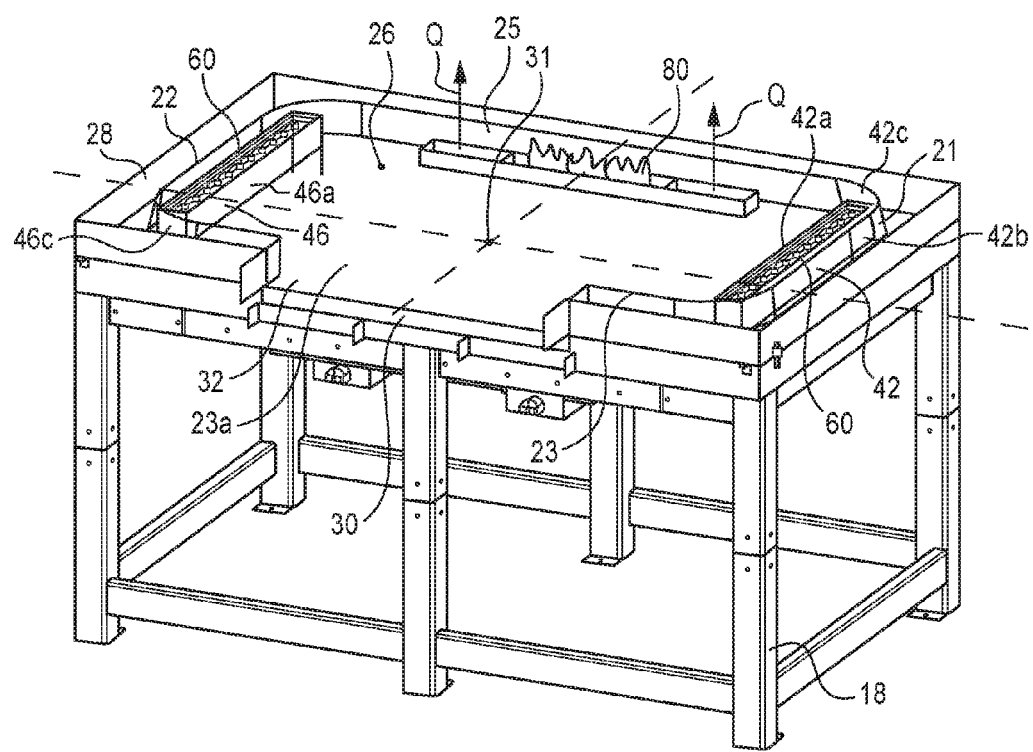
FIG. 2 is the view of the oven of FIG. 1 with a portion of each side wall removed.
Figure 3:
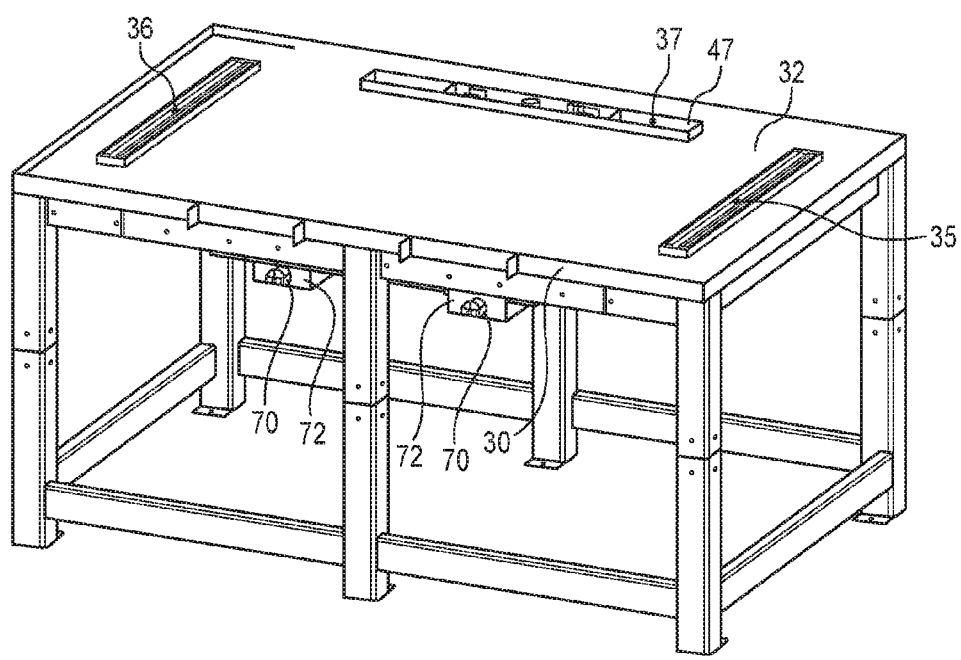
FIG. 3 is the view of the oven of FIG. 1 with the side walls removed.
Figure 4:
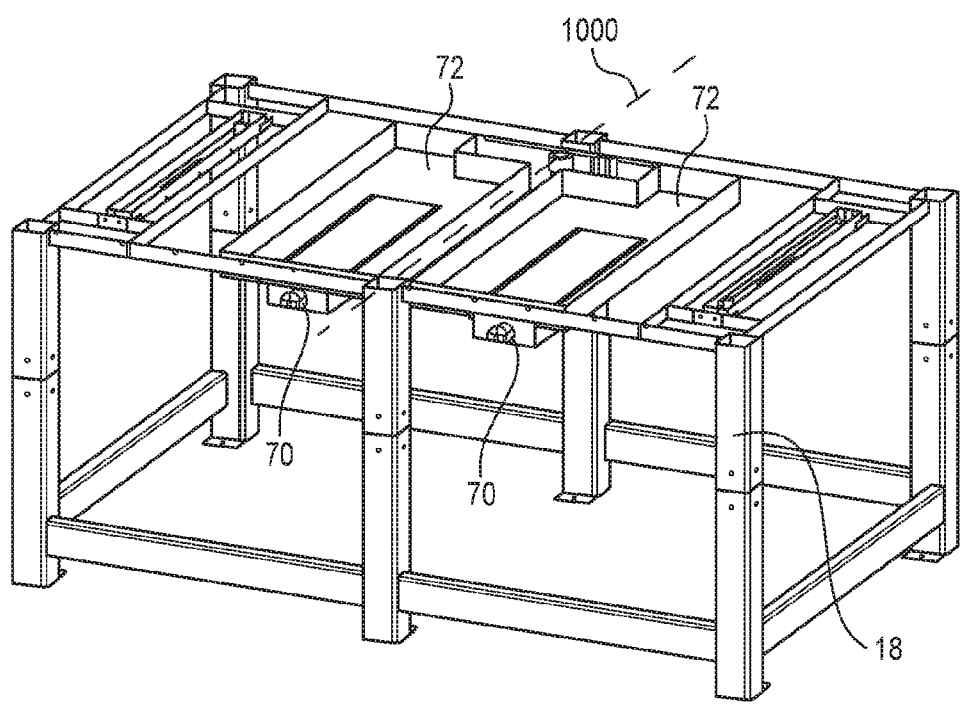
FIG. 4 is the view of FIG. 3 with the baking deck removed.

In some embodiments, the box 72 is disposed in conjunction with the rear void 37 in the baking surface, and specifically such that combustion gas from the box flows through the rear void 37 and into the baking enclosure 26, as depicted schematically as flow path Q in FIGS. 2 and 5a. This heated combustion gas additionally serves to heat the baking enclosure 26. In embodiments where there are two boxes 72 provided (which in some embodiments are positioned on opposite sides of the right to left centerline of the baking surface), each box 72 is positioned in communication with the baking enclosure 26 via separate paths through the rear void 37.

In some embodiments, a burner 80 may be provided within the oven 10 and specifically may extend through a rear void 37 and a rear shroud 47. The burner 80 may be constantly operating during operation of the oven to provide display of a flame within the oven for ornamental aspects, and the burner 80 may or may not provide a meaningful input of heat to the enclosure 26. In some embodiments, the burner may be a tube burner with a number of apertures to spread the flame generated by the burner along a horizontal length of the burner 80 for visual purposes. In other embodiments, in-shot burners 60 may be provided through the rear void 37 and those burners may also be operated by the controller for a significant addition of heat to the enclosure 26.

The controller 1001 may operate the oven in various duty cycles of the burners 60 that extend through one of both of the left and right voids 35, 36 and the burners 70 that are disposed below the bottom surface 33 of the baking deck 30. The duty cycles may be based upon feedback control based upon the information received from one or more of the thermocouples 130 that are provided within the baking deck 30.

Through experimentation, it has been determined that the oven 10 as disclosed herein preforms significantly better than the conventional oven discussed above, with respect to thermal performance for the same heat input as well as with respect to providing a significantly more uniform baking temperature throughout the top surface of the baking deck. This improved performance is beneficial for many ways, such as higher baking deck surface temperatures for a given heat input, and more uniform surface temperatures at different positions upon the baking deck. This second benefit may allow the chef to cook more food products simultaneously upon the cooking deck 30 due to the lessened need to move the pizzas during cooking as with the conventional oven (due to the differing surface temperatures found during operation of the conventional oven), which allows the chef to potentially cook more pizzas at the same time because less time and attention can be paid to each pizza during the cooking process.

Moreover, it has been determined that the oven disclosed herein with a baking deck made from the silicon carbide cement composition discussed above is significantly better than oven decks that are made from other compositions such as Alumina silica, due to the increased thermal conductivity of the silicon carbide cement. For example, the following data was derived based on testing an oven with the same geometry and heat input to compare an Alumina/silica deck with a deck of the silicon carbide composition. The data provided below presents the average internal temperature of the deck at two positions, with one measuring the center of the deck and the second measuring 0.5 inches from the top surface of the deck. Both decks were heated with the same underfloor burner and the same burners operating within the cooking volume. Tables that depict the improvement (the minimized difference in temperature over time are presented below.

TABLE 1

Internal and Surface Temperature of Baking Deck During Heat Up from Below the Baking Deck - Baking Deck made from Alumina/silica Compound Alumina/silica Deck, Tube Burner

| Time Elapsed | Average Internal Temperature (F.) | Average Surface Temperature (F.) | Difference between Internal and Surface Temperature (F.) |
|---|---|---|---|
| 0 | 260 | 255 | 6 |
| 5 | 263 | 282 | −19 |
| 10 | 273 | 304 | −31 |
| 15 | 289 | 325 | −37 |
| 20 | 308 | 346 | −39 |
| 25 | 329 | 368 | −39 |
| 30 | 351 | 389 | −38 |
| 35 | 373 | 410 | −37 |
| 40 | 395 | 432 | −36 |
| 45 | 417 | 452 | −35 |
| 50 | 439 | 472 | −33 |
| 55 | 460 | 490 | −30 |

TABLE 2

Internal and Surface Temperature of Baking Deck During Heat Up from Below the Baking Deck - Baking Deck Made from Silicon Carbide Compound Silicon Carbide Deck, Tube Burner

| Time Elapsed | Average Internal Temperature (F.) | Average Surface Temperature (F.) | Difference between Internal and Surface Temperature (F.) |
|---|---|---|---|
| 0 | 251 | 248 | 3 |
| 5 | 255 | 260 | −5 |
| 10 | 271 | 275 | −4 |
| 15 | 291 | 293 | −2 |
| 20 | 313 | 313 | −1 |
| 25 | 335 | 335 | 0 |
| 30 | 357 | 356 | 0 |
| 35 | 378 | 378 | 1 |
| 40 | 399 | 398 | 1 |
| 45 | 419 | 418 | 1 |
| 50 | 439 | 437 | 1 |
| 55 | 458 | 456 | 2 |

As can be seen in Tables 1 and 2, during heat up the difference in temperature between the internal temperature of the baking deck and the surface temperature gets to a negligible difference (1 or less degree F.) within 20 minutes of initial heat up, while the Alumina Silica Deck never reaches a negligible difference between internal temperature and surface temperature. Because the deck with the silicon carbide composition reaches a generally uniform temperature between the internal and the surface temperature, the deck can transfer heat, in either direction relatively rapidly as needed during cooking operations to maintain a relatively constant baking temperature, either from the surface to the internal, or from the internal upward toward the surface, i.e. when a new relatively cold pizza is placed upon the baking deck. The baking deck that is formed from a continuous piece also allows for heat to transfer both vertically as well as horizontally within the baking deck for maintaining a uniform surface temperature during cooking operations.

It has also been experimentally determined that replacing the conventional tube burners that heat the cooking enclosure with a plurality of in-shot burners that extend through apertures in the baking deck significantly improves the cooking performance of an oven. Specifically, because in-shot burners are known to burn with a much more efficient burn than tube burners, which, in combination with the flow patterns generated within the cooking enclosure (A, B, D, E) discussed above, is believed to provide a significantly more uniform temperature across the cooking surface, as measured by thermocouples that are spaced along the baking surface.

Various representative embodiments of the disclosure can be further understood with reference to the numbered paragraphs provided below:

Numbered Paragraph 1: An oven, comprising:
a housing comprising a baking surface, right and left side walls, a rear wall and a roof collectively defining an enclosure, the housing further comprising an opening through a front wall of the housing to allow access to the enclosure,
wherein the baking surface extends within the housing and extends between the right and left side walls and extends between the front wall and the rear wall, the baking surface includes a thickness, the baking surface comprises an elongate right aperture proximate to the right wall and an elongate left aperture proximate to the left side wall, wherein the baking surface is formed as a continuous monolithic member and does not have any seams or joints therein,
wherein the baking surface is silicon carbide cement.

Numbered Paragraph 2: The oven of numbered paragraph 1, further comprising a plurality of in-shot burners extending through the elongate right aperture and a plurality of in-shot burners extending through the elongate left aperture.

Numbered Paragraph 3: The oven of numbered paragraph 2, wherein the plurality of in-shot burners are each disposed at an acute angle with respect to a vertical axis within the housing of the oven.

Numbered Paragraph 4: The oven of numbered paragraph 1, further comprising a first shroud with a side wall extending above an upper surface of the baking surface and extending along a perimeter of the elongate right aperture and a second shroud with a side wall extending above the upper surface of the baking surface and extending along a perimeter of the elongate left aperture.

Numbered Paragraph 5: The oven of numbered paragraph 1, wherein the side wall of the first shroud is disposed at a first acute angle with respect to a vertical axis within the housing, such that the side wall extends with a vector component extending toward a center of the baking surface, and the side wall of the second shroud is disposed at a second acute angle with respect to the vertical axis of the housing, such that the side wall extends with a vector component extending toward the center of the baking surface.

Numbered Paragraph 6: The oven of numbered paragraph 5, wherein one or both of the first and second acute angles are within the range of 50 to 80 degrees relative to a planar top surface of the baking surface.

Numbered Paragraph 7: The oven of numbered paragraph 1, wherein the silicon carbide cement comprises about 53 percent silicon carbide.

Numbered Paragraph 8: The oven of numbered paragraph 1, wherein the silicon carbide cement comprises about 32 percent aluminum oxide.

Numbered Paragraph 9: The oven of numbered paragraph 1, wherein the silicon carbide cement comprises about 12 percent silica.

Numbered Paragraph 10: The oven of numbered paragraph 1, wherein the baking surface is formed with one or more thermocouples disposed within a volume of the baking surface.

Numbered Paragraph 11: The oven of numbered paragraph 1, wherein the baking surface receives one or more thermocouples embedded within the baking surface.

Numbered Paragraph 12: The oven of numbered paragraph 11, wherein a first thermocouple of the one or more thermocouples is positioned proximate to the left to right centerline of the baking surface.

Numbered Paragraph 13: The oven of numbered paragraph 12, wherein other thermocouples of the one or more thermocouples are positioned outboard of the first thermocouple on a right side of the left to right centerline and still other thermocouples of the one or more thermocouples are positioned outboard of the first thermocouple on a left side of the left to right centerline.

Numbered Paragraph 14: The oven of numbered paragraph 11, further comprising a controller that receives a signal from the one or more thermocouples representative of the measured temperature of the one or more thermocouples, wherein the controller is configured to control the operation of a plurality of in-shot burners extending through the elongate left aperture and to control the operation of a plurality of in-shot burners extending through the elongate right aperture, wherein the controller controls the operation of the plurality of in-shot burners based upon the measured temperature of the one more thermocouples in comparison with a desired temperature of the enclosure.

Numbered Paragraph 15: The oven of numbered paragraph 13, wherein the desired temperature of the enclosure is established by the user or is understood by the controller in furtherance of a recipe programmed into the controller.

Numbered Paragraph 16: The oven of numbered paragraph 1, further comprising a box disposed below a bottom surface of the baking surface, wherein the box includes a volume that is in thermal communication with the bottom surface of the baking surface, wherein the box includes at least one burner that when operating generates heat that at least a portion of which is transferred to the baking surface.

Numbered Paragraph 17: The oven of numbered paragraph 16, wherein the box comprises first and second boxes that are disposed just outboard of a left to right centerline of the baking surface with the first and second enclosures disposed on opposite sides of the left to right centerline.

Numbered Paragraph 18: An oven, comprising:

a housing comprising a baking surface, right and left side walls, a rear wall and a roof collectively defining an enclosure, the housing further comprising an opening through a front wall of the housing to allow access to the enclosure, wherein the baking surface extends within the housing and extends between the right and left side walls and extends between the front wall and the rear wall, the baking surface includes a thickness, the baking surface comprises an elongate right aperture proximate to the right wall and an elongate left aperture proximate to the left side wall, wherein a first plurality of in-shot burners extend through the elongate right aperture and a second plurality of in-shot burners extend through the elongate left aperture, wherein during operation heated combustion gas from the burners is directed toward the roof of the enclosure during operation, further comprising a box disposed below the baking surface with an interior that is in thermal communication with the baking surface, wherein the box supports a burner that is oriented such that heated combustion gas from the burners flows through the box and a portion of the heat from combustion is transferred through the baking surface.

Numbered Paragraph 19: The oven of numbered paragraph 18, wherein the first plurality of in-shot burners are disposed at a first acute angle with respect to a horizontal plane through a top surface of the baking surface, and the second plurality of in-shot burners are disposed at a second acute angle with respect to a horizontal plane through the top surface of the baking surface.

Numbered Paragraph 20: The oven of numbered paragraph 19, wherein the first and second acute angles are substantially equal, wherein a line through a representative burner of the first plurality of burners includes a horizontal vector component that extends toward a left to right centerline of the baking surface, and wherein a line through a representative burner of the second plurality of burners includes a horizontal vector component that extends toward the left to right centerline of the baking surface.

Numbered Paragraph 21: The oven of numbered paragraph 19, wherein the plurality of first in-shot burners and the plurality of second in-shot burners are arranged such that, during operation, combustion gas from each for the first and second plurality of burners interacts with each other within the enclosure.

Numbered Paragraph 22: The oven of numbered paragraph 21, wherein the combustion gas from each of the first and second plurality of in-shot burners travels within the enclosure with a generally looped flow such that a portion of the combustion gas that leaves the first plurality of in-shot burners returns to the first plurality of in-shot burners.

Numbered Paragraph 23: The oven of numbered paragraph 18, wherein the baking surface receives one or more thermocouples embedded within the baking surface.

Numbered Paragraph 24: The oven of numbered paragraph 23, wherein a first thermocouple of the one or more thermocouples is positioned proximate to the left to right centerline of the baking surface.

Numbered Paragraph 25: The oven of numbered paragraph 24, wherein other thermocouples of the one or more thermocouples are positioned outboard of the first thermocouple on a right side of the left to right centerline and still other thermocouples of the one or more thermocouples are positioned outboard of the first thermocouple on a left side of the left to right centerline.

Numbered Paragraph 26: The oven of numbered paragraph 23, further comprising a controller that receives a signal from each of the one or more thermocouples that is representative of the measured temperature of the respective one or more thermocouples, wherein the controller is configured to control the operation of a plurality of in-shot burners extending through the elongate left aperture and to control the operation of a plurality of in-shot burners extending through the elongate right aperture, wherein the controller controls the operation of the plurality of in-shot burners based upon the measured temperature of the one more thermocouples in comparison with a desired temperature of the enclosure.

Numbered Paragraph 27: The oven of numbered paragraph 18, further comprising a rear aperture through the baking surface, wherein a portion of the rear aperture provides a path for combustion products from the burner disposed within the box to reach the enclosure.

Numbered Paragraph 28: The oven of numbered paragraph 18, wherein the box is first and second boxes that are disposed on opposite sides outboard of a left to right centerline of the baking surface, wherein each of the first and second boxes support burners that are each oriented such that heated combustion gas from the burners flows through the box and a portion of the heat from combustion is transferred through the baking surface.

Numbered Paragraph 29: The oven of numbered paragraph 28, further comprising a rear aperture through the baking surface, wherein first and second portions of the rear aperture each provide a path for combustion products from the burner disposed within the respective first and second box to reach the enclosure.

Numbered Paragraph 30: The oven of numbered paragraph 29, wherein the rear aperture further includes a tube burner disposed therein or therethrough such that, during operation, flames from the tube burner extend from the rear aperture and toward or into the enclosure.

Numbered Paragraph 31: The oven of numbered paragraph 18, wherein the baking surface is formed as a continuous monolithic member and does not have any seams or joints therein, wherein the baking surface is silicon carbide cement.

Numbered Paragraph 32: The oven of numbered paragraph 25, wherein one or more of the other thermocouples positioned outboard of the first thermocouple on the right side of the left to right centerline through the baking surface is disposed vertically above the box, and one or more of the other thermocouples positioned outboard of the first thermocouple on the right side of the left to right centerline through the baking surface is disposed horizontally outboard of the box.

Numbered Paragraph 33: The oven of numbered paragraph 18. wherein the roof of the housing partially defines the enclosure and is disposed vertically above the first plurality of in-shot burners is disposed at an acute angle with respect to the top surface of the baking surface.

Numbered Paragraph 34: The oven of numbered paragraph 33, wherein the roof that is disposed vertically above the first plurality of in-shot burners is disposed at a curved orientation such that the magnitude of the acute angle changes from a position vertically above the plurality of in-shot burners and extending toward a right to left centerline of the roof, with the magnitude of the acute angle decreasing as the roof travels toward the right to left centerline of the roof.

Numbered Paragraph 35: An oven, comprising:
a housing comprising a baking surface, right and left side walls, a rear wall and a roof collectively defining an enclosure, the housing further comprising an opening through a front wall of the housing to allow access to the enclosure, wherein the baking surface extends within the housing and extends between the right and left side walls and extends between the front wall and the rear wall, the baking surface includes a thickness, the baking surface comprises an elongate right aperture proximate to the right wall and an elongate left aperture proximate to the left side wall, further comprising a first thermocouple that is disposed within the baking surface, wherein the first thermocouple makes direct contact with the baking surface and is embedded within the baking surface.

Numbered Paragraph 36: The oven of numbered paragraph 35, further comprising an assembly that extends within the baking surface from a bottom surface of the baking surface, wherein the assembly supports the first thermocouple within the baking deck and aligns and supports thermocouple wires that extend from the baking deck.

Numbered Paragraph 37: The oven of numbered paragraph 36, further comprising an insulation layer disposed between an outer wall of the assembly and the baking deck, wherein the first thermocouple extends into the baking deck from the insulation layer.

Numbered Paragraph 38: The oven of numbered paragraph 35, wherein the first thermocouple, is a plurality of first thermocouples that are vertically aligned within the baking deck, wherein the plurality of first thermocouples is a top thermocouple that is disposed proximate to a top surface of the baking deck, and a middle thermocouple that is disposed proximate to a vertical middle of the baking deck.

Numbered Paragraph 39: The oven of numbered paragraph 38, further comprising a bottom thermocouple that is disposed vertically below the top and middle thermocouples and is disposed proximate to a bottom surface of the baking deck.

Numbered Paragraph 40: The oven of numbered paragraph 35, wherein the baking surface is formed as a continuous monolithic member and does not have any seams or joints therein.

Numbered Paragraph 41: The oven of numbered paragraph 35, wherein the baking surface is silicon carbide cement.

Numbered Paragraph 42: The oven of numbered paragraph 35, further comprising a plurality of in-shot burners extending through the elongate right aperture and a plurality of in-shot burners extending through the elongate left aperture.

Numbered Paragraph 43: The oven of numbered paragraph 42, wherein the plurality of in-shot burners are each disposed at an acute angle with respect to a vertical axis within the housing of the oven.

Numbered Paragraph 44: The oven of numbered paragraph 35, further comprising one or more second thermocouples that are positioned outboard of the first thermocouple on a right side of a left to right centerline and one or more third thermocouples that are positioned outboard of the first thermocouple on a left side of the left to right centerline.

Numbered Paragraph 45: The oven of numbered paragraph 35, further comprising a box disposed below a bottom surface of the baking surface, wherein the box includes a volume that is in thermal communication with the bottom surface of the baking surface, wherein the box includes at least one burner that when operating generates heat that at least a portion of which is transferred to the baking surface.

Numbered Paragraph 46: The oven of numbered paragraph 45, wherein the box comprises first and second boxes that are disposed just outboard of a left to right centerline of the baking surface with the first and second enclosures disposed on opposite sides of a left to right centerline of the baking deck.

Numbered Paragraph 47: The oven of numbered paragraph 42, further comprising a controller that receives a signal from the first thermocouple that is representative of the measured temperature of the first thermocouple, wherein the controller is configured to control the operation of a plurality of in-shot burners extending through the elongate left aperture and to control the operation of a plurality of in-shot burners extending through the elongate right aperture, wherein the controller controls the operation of the plurality of in-shot burners based upon the measured temperature of the first thermocouple in comparison with a desired temperature of the enclosure.

While the preferred embodiments of the disclosure have been described, it should be understood that the disclosure is not so limited and modifications may be made without departing from the invention. The scope of the invention is defined by the appended claims, and all devices that come within the meaning of the claims, either literally or by equivalence, are intended to be embraced therein.

The invention claimed is:

1. An oven, comprising:
a housing comprising a baking surface, right and left side walls, a rear wall and a roof collectively defining an enclosure, the housing further comprising an opening through a front wall of the housing to allow access to the enclosure,
wherein the baking surface extends within the housing and extends between the right and left side walls and extends between the front wall and the rear wall, the baking surface includes a thickness, the baking surface comprises an elongate right aperture proximate to the right wall and an elongate left aperture proximate to the left side wall, further comprising a first thermocouple that is disposed within the baking surface, wherein the first thermocouple makes direct contact with the baking surface and is embedded within the baking surface,
further comprising one or more second thermocouples that are positioned outboard of the first thermocouple on a right side of a left to right centerline and one or more third thermocouples that are positioned outboard of the first thermocouple on a left side of the left to right centerline.

2. The oven of claim 1, further comprising an assembly that extends within the baking surface from a bottom surface of the baking surface, wherein the assembly supports the first thermocouple within the baking surface and aligns and supports thermocouple wires that extend from the baking surface.

3. The oven of claim 2, further comprising an insulation layer disposed between an outer wall of the assembly and the baking surface, wherein the first thermocouple extends into the baking surface from the insulation layer.

4. The oven of claim 1, wherein the first thermocouple, is a plurality of first thermocouples that are vertically aligned within the baking deck, wherein the plurality of first thermocouples is a top thermocouple that is disposed proximate to a top surface of the baking deck, and a middle thermocouple that is disposed proximate to a vertical middle of the baking deck.

5. The oven of claim 1, wherein the baking surface is formed as a continuous monolithic member and does not have any seams or joints therein.

6. The oven of claim 1, wherein the baking surface is silicon carbide cement.

7. The oven of claim 1, further comprising a plurality of in-shot burners extending through the elongate right aperture and a plurality of in-shot burners extending through the elongate left aperture.

8. The oven of claim 7, further comprising a controller that receives a signal from the first thermocouple that is representative of the measured temperature of the first thermocouple, wherein the controller is configured to control the operation of a plurality of in-shot burners extending through the elongate left aperture and to control the operation of a plurality of in-shot burners extending through the elongate right aperture, wherein the controller controls the operation of the plurality of in-shot burners based upon the measured temperature of the first thermocouple in comparison with a desired temperature of the enclosure.

9. The oven of claim 1, further comprising a box disposed below a bottom surface of the baking surface, wherein the box includes a volume that is in thermal communication with the bottom surface of the baking surface, wherein the box includes at least one burner that when operating generates heat that at least a portion of which is transferred to the baking surface.

10. An oven, comprising:
a housing comprising a baking surface, right and left side walls, a rear wall and a roof collectively defining an enclosure, the housing further comprising an opening through a front wall of the housing to allow access to the enclosure,
wherein the baking surface extends within the housing and extends between the right and left side walls and extends between the front wall and the rear wall, the baking surface includes a thickness, the baking surface comprises an elongate right aperture proximate to the right wall and an elongate left aperture proximate to the left side wall, wherein a first plurality of in-shot burners extend through the elongate right aperture and a second plurality of in-shot burners extend through the elongate left aperture, wherein during operation heated combustion gas from the burners is directed toward the roof of the enclosure during operation,
further comprising a box disposed below the baking surface with an interior that is in thermal communication with the baking surface, wherein the box supports a burner that is oriented such that heated combustion gas from the burners flows through the box and a portion of the heat from combustion is transferred through the baking surface,
wherein the baking surface receives one or more thermocouples embedded within the baking surface, wherein a first thermocouple of the one or more thermocouples is positioned proximate to the left to right centerline of the baking surface, wherein other thermocouples of the one or more thermocouples are positioned outboard of the first thermocouple on a right side of the left to right centerline and still other thermocouples of the one or more thermocouples are positioned outboard of the first thermocouple on a left side of the left to right centerline.

11. The oven of claim 10, wherein the first plurality of in-shot burners are disposed at a first acute angle with respect to a horizontal plane through a top surface of the baking surface, and the second plurality of in-shot burners are disposed at a second acute angle with respect to a horizontal plane through the top surface of the baking surface.

12. The oven of claim 11, wherein the plurality of first in-shot burners and the plurality of second in-shot burners are arranged such that, during operation, combustion gas from each for the first and second plurality of burners interacts with each other within the enclosure.

13. The oven of claim 12, wherein the combustion gas from each of the first and second plurality of in-shot burners travels within the enclosure with a generally looped flow such that a portion of the combustion gas that leaves the first plurality of in-shot burners returns to the first plurality of in-shot burners.

14. The oven of claim 10, further comprising a controller that receives a signal from each of the one or more thermocouples that is representative of the measured temperature of the respective one or more thermocouples, wherein the controller is configured to control the operation of a plurality of in-shot burners extending through the elongate left aperture and to control the operation of a plurality of in-shot burners extending through the elongate right aperture, wherein the controller controls the operation of the plurality of in-shot burners based upon the measured temperature of the one more thermocouples in comparison with a desired temperature of the enclosure.

15. The oven of claim 14, wherein one or more of the other thermocouples positioned outboard of the first thermocouple on the right side of the left to right centerline through the baking surface is disposed vertically above the box, and one or more of the other thermocouples positioned outboard of the first thermocouple on the right side of the left to right centerline through the baking surface is disposed horizontally outboard of the box.

16. The oven of claim 10, further comprising a rear aperture through the baking surface, wherein a portion of the rear aperture provides a path for combustion products from the burner disposed within the box to reach the enclosure.

17. The oven of claim 16, wherein the rear aperture further includes a tube burner disposed therein or therethrough such that, during operation, flames from the tube burner extend from the rear aperture and toward or into the enclosure.

18. The oven of claim 10, wherein the baking surface is formed as a continuous monolithic member and does not have any seams or joints therein, wherein the baking surface is silicon carbide cement.

19. The oven of claim 10, wherein the roof of the housing partially defines the enclosure and is disposed vertically above the first plurality of in-shot burners is disposed at an acute angle with respect to the top surface of the baking surface, wherein the roof that is disposed vertically above the first plurality of in-shot burners is disposed at a curved orientation such that the magnitude of the acute angle changes from a position vertically above the plurality of in-shot burners and extending toward a right to left centerline of the roof, with the magnitude of the acute angle decreasing as the roof travels toward the right to left centerline of the roof.

20. An oven, comprising:
a housing comprising a baking surface, right and left side walls, a rear wall and a roof collectively defining an enclosure, the housing further comprising an opening through a front wall of the housing to allow access to the enclosure,
wherein the baking surface extends within the housing and extends between the right and left side walls and extends between the front wall and the rear wall, the baking surface includes a thickness, the baking surface comprises an elongate right aperture proximate to the right wall and an elongate left aperture proximate to the left side wall, wherein the baking surface is formed as a continuous monolithic member and does not have any seams or joints therein,
wherein the baking surface is silicon carbide cement,
further comprising a plurality of in-shot burners extending through the elongate right aperture and a plurality of in-shot burners extending through the elongate left aperture,
wherein the baking surface receives one or more thermocouples embedded within the baking surface, wherein a first thermocouple of the one or more thermocouples is positioned proximate to the left to right centerline of the baking surface, wherein other thermocouples of the one or more thermocouples are positioned outboard of the first thermocouple on a right side of the left to right centerline and still other thermocouples of the one or more thermocouples are positioned outboard of the first thermocouple on a left side of the left to right centerline.

21. The oven of claim 20, wherein the plurality of in-shot burners are each disposed at an acute angle with respect to a vertical axis within the housing of the oven,
further comprising a first shroud with a side wall extending above an upper surface of the baking surface and extending along a perimeter of the elongate right aperture and a second shroud with a side wall extending above the upper surface of the baking surface and extending along a perimeter of the elongate left aperture, wherein the side wall of the first shroud is disposed at a first acute angle with respect to a vertical axis within the housing, such that the side wall extends with a vector component extending toward a center of the baking surface, and the side wall of the second shroud is disposed at a second acute angle with respect to the vertical axis of the housing, such that the side wall extends with a vector component extending toward the center of the baking surface.

22. The oven of claim 20, further comprising a controller that receives a signal from the one or more thermocouples representative of the measured temperature of the one or more thermocouples, wherein the controller is configured to control the operation of a plurality of in-shot burners extending through the elongate left aperture and to control the operation of a plurality of in-shot burners extending through the elongate right aperture, wherein the controller controls the operation of the plurality of in-shot burners based upon the measured temperature of the one or more thermocouples in comparison with a desired temperature of the enclosure.

23. The oven of claim 22, wherein the desired temperature of the enclosure is established by the user or is understood by the controller in furtherance of a recipe programmed into the controller.

24. The oven of claim 20, further comprising a box disposed below a bottom surface of the baking surface, wherein the box includes a volume that is in thermal communication with the bottom surface of the baking surface, wherein the box includes at least one burner that when operating generates heat that at least a portion of which is transferred to the baking surface.

* * * * *